(No Model.)
M. GARLAND.
BAND SAW MILL.
No. 356,035. Patented Jan. 11, 1887.
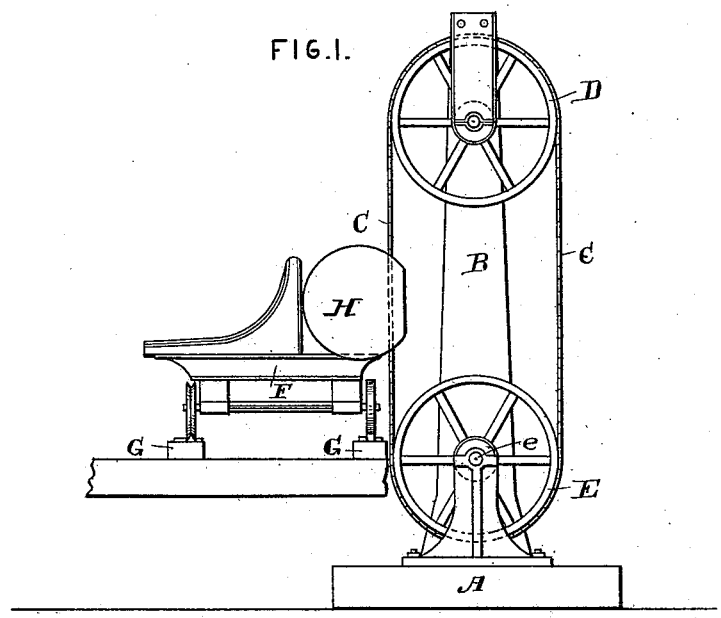
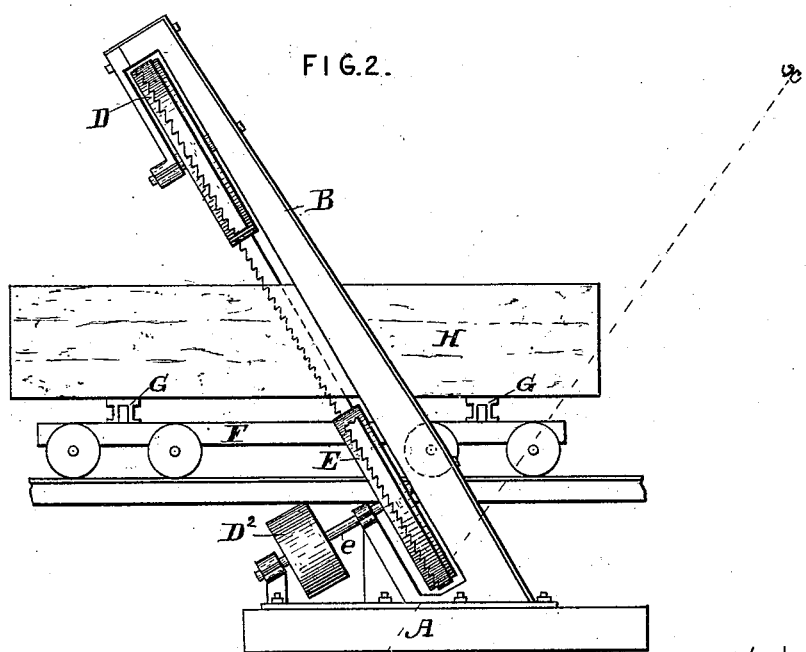
ATTEST—
J. Henry Kaiser
Harry L. Amer
INVENTOR—
Michael Garland
By J. N. McIntire
Atty

UNITED STATES PATENT OFFICE.

MICHAEL GARLAND, OF BAY CITY, MICHIGAN, ASSIGNOR TO JAMES E. EMERSON, OF BEAVER FALLS, PENNSYLVANIA.

BAND-SAW MILL.

SPECIFICATION forming part of Letters Patent No. 356,035, dated January 11, 1887.

Application filed May 9, 1885. Serial No. 164,963. (No model.)

*To all whom it may concern:*

Be it known that I, MICHAEL GARLAND, of Bay City, in the county of Bay and State of Michigan, have invented certain new and useful Improvements in Band-Saw Mills; and I do hereby declare that the following is a full, clear, and exact description thereof, reference being had to the accompanying drawings, making part of this application.

My invention relates to a new and useful improvement in band-saw mills, and has for its main object to provide for use a band-saw which, with all other things equal, will do considerably more work with the same expenditure of motive power than it has heretofore been possible to accomplish.

As is well known by those familiar with the state of the art relating to band-saw mills, it has been the general practice previous to my invention to have band-saws arranged so as to run or work in a plane at right angles to that in which the carriage on which the timber to be sawed rests, lies and moves, so that the line of cut or the plane of movement of the cutting-edge of the saw must be always practically at about right angles to the line or direction in which the grain of the log of wood runs, although it has been suggested (and Letters Patent have been granted for such invention) to place the saw in an inclined position, so as to cut against the grain.

It is a fact well known to most every one that in the use of a knife to cut off the end of a stick, or in the use of an axe to cut through a log crosswise of the grain, the difficulty of penetrating the stock with the cutting-edge of the implement used increases or diminishes accordingly as the cutting-edge of the tool is caused to travel in a plane more or less transverse to the plane or line in which the grain of the wood runs. The reason for this is the same as that in the use of the ordinary carpenter's hand-saw, the operation of "ripping" up a board can be more easily and expeditiously performed (with the same expenditure of physical power) when the saw is used with its cutting-edge traveling in a plane more or less oblique to the line of the grain of the wood than it would be possible to do the same work were the saw worked at right angles to the direction in which the grain runs. I propose to apply this same principle of operation to a band-saw mill, and thereby render the saw capable of doing a large percentage more of work with the same expenditure of motive power than has heretofore been accomplished.

To this main end and object my invention may be said to consist, essentially, in a band-saw mill having the saw and its driving-pulleys (and the frame carrying the wheels) so mounted and arranged relatively to the log to be cut (or the carriage on which the log is mounted) that the cutting operation shall be performed in a line or plane more or less oblique to the direction or line in which the grain of the log lies; whereby greatly improved results may be attained in the mill, all as will be hereinafter more fully set forth.

To enable those skilled in the art to which my invention relates to fully understand and practice my improvement, I will now proceed to more fully describe it, referring by letters to the accompanying drawings, in which I have shown my invention carried out in that form in which I have so far contemplated using it, and which is the best now known to me, though other forms may of course be adopted, as experience with and the practical development of my invention may show to be desirable.

In the accompanying drawings, which form part of this invention, Figure 1 is a side elevation, and Fig. 2 is a face or front view, of a band-saw mounted according to my invention, and so much of the other portions of a mill as are necessary to be shown to sufficiently illustrate my invention.

In the two views the same part will be found designated by the same letter of reference.

A is the foundation-plate of the husk, and B the husk, which, as shown, is inclined forward, as it projects upwardly from the foundation-plate A, at an angle of about twenty-two degrees.

C is the band-saw, of about the usual approved construction, and mounted on the peripheries of the wheels D and E, that are journaled, respectively, near the upper and lower portions of the husk B, and the lower one of which, E, has its shaft *e* extended for the reception of the driving-pulley D², and acts as the driver of the band-saw.

F is the usual saw-carriage, provided with head-blocks G G, and adapted to hold and carry along the log or timber (shown at H) to be sawed.

As will be readily understood, and as will be seen from the drawings, the cutting-edge of the band saw C, instead of working at about right angles to the line of the grain of log H, as usual prior to my invention, travels or runs in a path oblique to the line of the grain of the wood, and hence acts on the stock in cutting it in a novel manner, and very much after the fashion of the action of a hand-saw used in the proper manner. By this arrangement of the saw C to cut obliquely to the grain of the log H, I am enabled with my improved contrivance to cut a larger quantity of stuff in the same time and with the same or less expenditure of motive power to drive the mill than is possible in the use of a band-saw arranged and worked according to any of the plans known previous to my invention.

Of course the degree of obliquity of the saw to the path of travel of the carriage and log may be varied more or less without departing from the principle of construction shown and described.

In lieu of giving the obliquity to the saw-band and husk, as shown, the same relative arrangement of the saw to the grain of the log H might be effected by having the log mounted out of parallelism with the carriage, and so as to be presented in an oblique or inclined position to a saw arranged in the usual vertical position, the essence of the innvention made by me consisting, it will be seen, in the novel relationship of the saw to the moving log, so that the cutting-edge of the saw shall move obliquely to the grain of the wood. I therefore wish it to be understood that my invention is dependent only upon the described relative arrangement of the saw and the log, and that no precise degree of obliquity in this arrangement is important, though with my present experience I deem an angle of about twenty-two degrees, as shown, a good arrangement of the parts.

Having now so fully explained the nature of my invention and that mode of carrying it into effect which is the best now known to me that those skilled in the art can use my improved construction of band-saw mills, what I claim as new, and desire to secure by Letters Patent, is—

In a band-saw mill, the frame B, secured in a backwardly-inclined position over the log to be sawed and having the band-saw passing over the pulleys E and D, secured upon said frame, in combination with the log-carriage F, arranged to feed the log to the saw in that direction which causes the saw to cut the fiber of the wood in the direction of its grain and with a shear cut, substantially as described and shown.

In witness whereof I have hereunto set my hand this sixteenth day of April, 1885.

MICHAEL GARLAND.

In presence of—
  W. J. McCORMICK,
  C. H. KLUMPH.